United States Patent

[11] 3,577,115

[72] Inventor Joseph W. E. Whitright
 Cheshire, Conn.
[21] Appl. No. 867,342
[22] Filed Oct. 17, 1969
[45] Patented May 4, 1971
[73] Assignee Cheshire Manufacturing Co., Inc.
 Cheshire, Conn.
 Continuation-in-part of application Ser. No.
 706,350, Feb. 19, 1968, Pat. No. 3,482,203

[54] ELECTRICAL CONNECTOR STORING DEVICE FOR MOTOR VEHICLE TRAILERS
 2 Claims, 4 Drawing Figs.

[52] U.S. Cl. .................................................. 339/36,
 174/135, 211/66, 248/111, 248/314, 280/422,
 339/10
[51] Int. Cl. ...................................................... H01r 13/44,
 H01r 13/52, A44b 21/00

[50] Field of Search.......................................... 339/36;
 24/81 (CC), 255 (R), 257, 259 (RC);
 211/(Inquired); 248/(Inquired); 280/(Inquired);
 174/(Inquired)

[56] References Cited
 UNITED STATES PATENTS
 3,265,297 8/1966 Behrens.................... 24/257X
 3,482,203 12/1969 Whitright.................... 339/36

*Primary Examiner*—Marvin A. Champion
*Assistant Examiner*—Terrell P. Lewis
*Attorneys*—Steward and Steward, Merrill F. Steward, Donald T. Steward and Walter H. Hunter

ABSTRACT: A device for storing and protecting an electrical plug on a trailer when disconnected from the motor vehicle by which the trailer is drawn, in which an inverted hood is provided on a mounting channel that is attached to a fixed portion of the trailer. The hood is attached to the mounting channel by simply inserting its wall into slots in the upper end of the channel, these slots being positioned so that the wall of the hood is gripped tightly between the flanges on one side and the web of the channel on the other.

PATENTED MAY 4 1971　　3,577,115
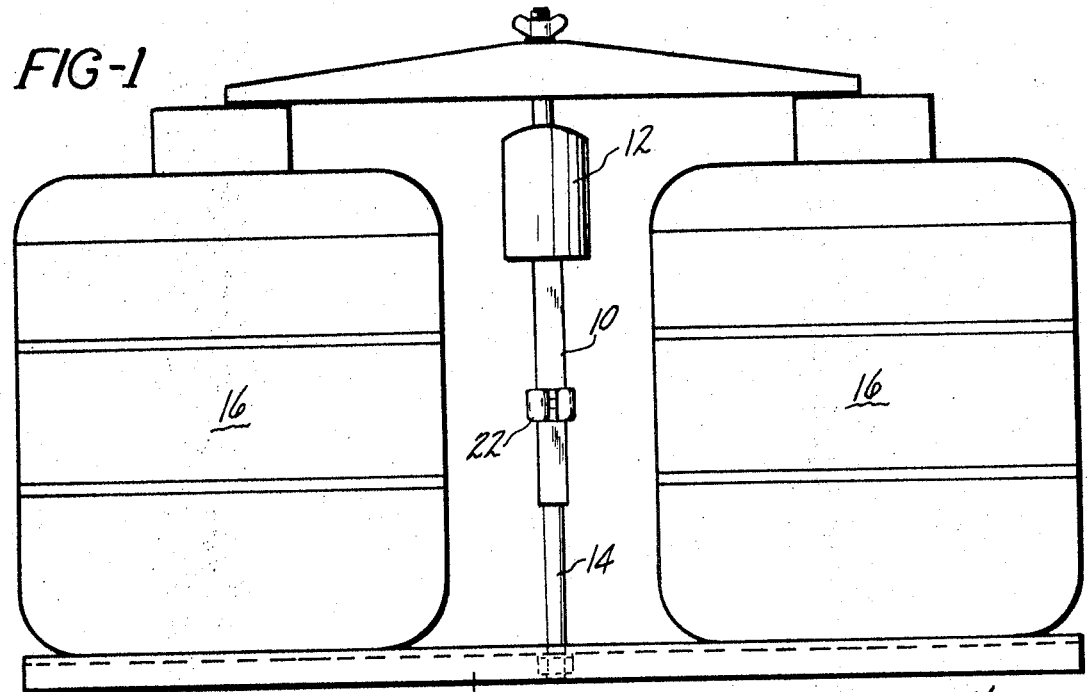
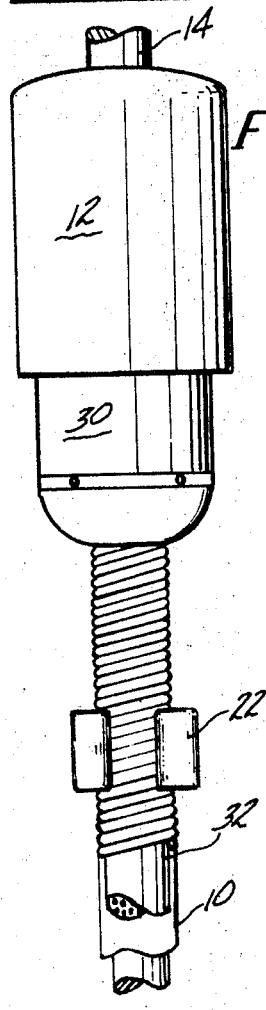
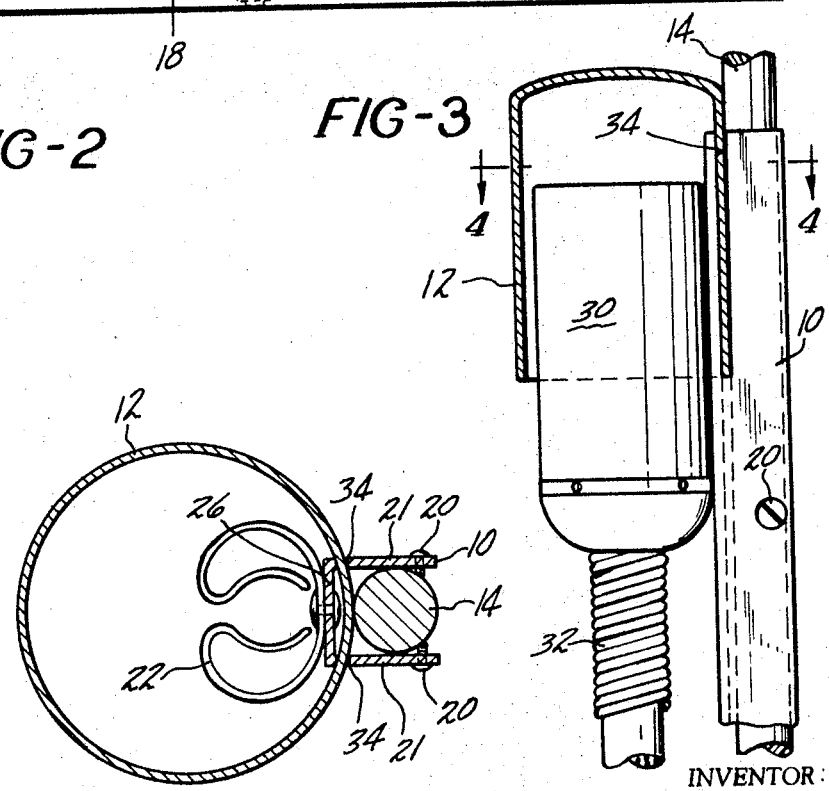
INVENTOR:
JOSEPH W.E. WHITRIGHT
BY Steward + Steward
his ATTORNEYS

ELECTRICAL CONNECTOR STORING DEVICE FOR MOTOR VEHICLE TRAILERS

This application is a continuation-in-part of my copending application, Ser. No. 706,350 now U.S. Pat. No. 3,482,203 filed Feb. 19, 1968.

BACKGROUND OF THE INVENTION

The invention relates to devices for storing and protecting an electrical connector for a motor vehicle trailer when the connector is disconnected, and it relates more particularly to a device of this nature which is mounted on the trailer near the tongue by which it is drawn, so that when the trailer is disconnected from the car or truck and the electrical connection is broken, the connector on the trailer can be hung up within a protective hood to prevent water and dirt from fouling the contacts.

Various devices have been provided for storing the electrical connector plug at the trailer when the connection is broken, most of which however are expensive and can be used with only one type or size of electrical plug. It is an object of the present invention to provide a device of this nature which is inexpensive and will work for various different sizes and shapes of plugs, including those having handles that extend outward from the sides of the plug body, by which the plug may be grasped in order to disconnect it from the mating plug of socket on the automobile or truck. Such a device must, therefore, be simple in design so that it is easy to manufacture and practically foolproof in use.

SUMMARY OF THE INVENTION

A protective hood and storage device embodying the present invention includes an elongated mounting channel by which it is supported on a suitable fixed part of the trailer, such as the vertical holddown rod for the propylene gas tanks. A hollow hood member is fixed to the upper end of the mounting channel with the open end of the hood facing downward when the device is mounted on the trailer. Means are provided on the mounting channel below the hood member for holding an electrical connector within the hood member when the connector is inserted upwardly into the open end of the inverted hood with the wire or cable extending down from the rear of the plug. In accordance with the present invention, the hood member, which is preferably made out of a tough nonconductive plastic, is fastened to the mounting channel by inserting the wall of the hood into slots cut lengthwise of the channel and from one end os that the wall of the hood is gripped between the flanges of the channel on the outside and the web of the channel inside.

One embodiment of the invention is illustrated in the accompanying drawings, wherein FIG. 1 is a front view of a typical gas tank installation at the front end of a trailer, where the plug protecting and storage and storage device of the present invention is shown mounted;

FIG. 2 is a front view of the device on a larger scale, an electrical connector plug being shown supported within the hood;

FIG. 3 is a side view of the unit with the hood shown in vertical section; and

FIG. 4 is an enlarged horizontal section taken on the line 4—4 of FIG. 3 with the connector plug removed.

The device of the present invention consists of a length of metal channel 10, at one end of which is fastened a cylindrical hood 12 with its open end facing toward the opposite end of channel 10. The channel 10 is readily mounted in a vertical position on any suitable part of the trailer (not shown) with the open end of the hood 10 facing down. Thus, as shown in FIG. 1, the mounting channel 10 is fastened to a holddown rod 14 for the gas supply tanks 16, 16, which are mounted on a tray 18 on the tongue (not shown) of the trailer. Or if desired, it may be attached to the vertical shaft of the drawbar jack on the trailer. In the example shown in the drawings, the mounting channel is large enough to fit around the rod 14 and is rigidly held in place by a pair of inwardly extending setscrews 20, 20 (FIGS. 3 and 4) which are threaded into the opposite side flanges 21, 21 of the U-shaped channel 10.

Spaced below the downwardly open end of the hood 12 and mounted on the web 26 of channel 10 is a spring clip 22, which may be for example a commercially available product known as a "Gibson" clip. As shown in FIGS. 2 and 3, a conventional connector plug 30 for the electrical supply cable 32 on the trailer is inserted upwardly into the open end of hood 12 and held therein by pressing the cable 32 between the gripping fingers of the "Gibson" clip.

The hood 12 is desirably made of a tough plastic or other nonconductive material so that if the connector plug 30 has exposed electrical contacts, these will not make electrical contact should they engage the inner surface of the hood. As will be seen by referring to FIGS. 3 and 4, hood 12 is supported on the mounting channel 10 within opposed slots 34, 34 cut lengthwise through the flanges 21, 21 from the upper end of the channel and immediately in back of its web 26. Slots 34, 34 are just wide enough to receive and snugly hold the cylindrical wall of hood 12, so that it is mounted firmly thereon. Slots 34, 34 should extend a substantial distance along the channel 10, preferably a distance almost equal to the depth of hood 12. If desired, a suitable cement may be applied along the line where the wall of the hood fits through slots 34, 34 in order to ensure that the hood is rigid with the mounting channel. It will be noted that this manner of attaching the hood to the mounting channel provides a simple, sturdy construction, while at the same time taking up only slightly more space within the hood than is required to accommodate the thickness of the web 26 of channel 10. Consequently, the interior of the hood is substantially unobstructed for easy insertion of the connector. Similarly, the wall of the hood on the opposite side of web 26 takes up very little room within the channel so that the mounting rod 14 is fully encompassed by the side flanges 21, 21 permitting the setscrews 20, 20 to be tightened down to hold the device securely in place.

I claim:

1. A protective hood and storage device for an electrical connector for a motor vehicle trailer when not in use, which comprises in combination an elongated mounting channel by which said device is fixed to a suitable portion of the trailer with the longitudinal axis of said mounting channel disposed substantially vertical and having means for fastening it to the trailer, said mounting channel being U-shaped in cross section with opposite parallel side flanges extending from a central web, said side flanges having slots extending longitudinally from one end of said mounting channel adjacent said web, a hollow hood member having one end closed and the opposite end open and having a wall fitted within such slots in said side flanges such that said flanges engage and support the outer surface of said wall while said web engages and supports the inner surface of said hood member, thereby rigidly fixing said hood member onto said mounting channel such that said open end is disposed downward when the device is mounted on the trailer, and means mounted on said channel member below said hood member for holding an electrical connector within said hood member when the connector is inserted upwardly into the open end of said hood member.

2. A device as defined in claim 1, wherein said hood member is made of a tough nonconductive plastic material and is permanently fastened within said slots in said flanges by means of an adhesive cement capable of gripping both said hood members and said mounting channel.